March 30, 1948.  E. MOORE  2,438,816
LUBRICATING MEANS FOR INTERNAL-COMBUSTION ENGINES
Filed April 13, 1946
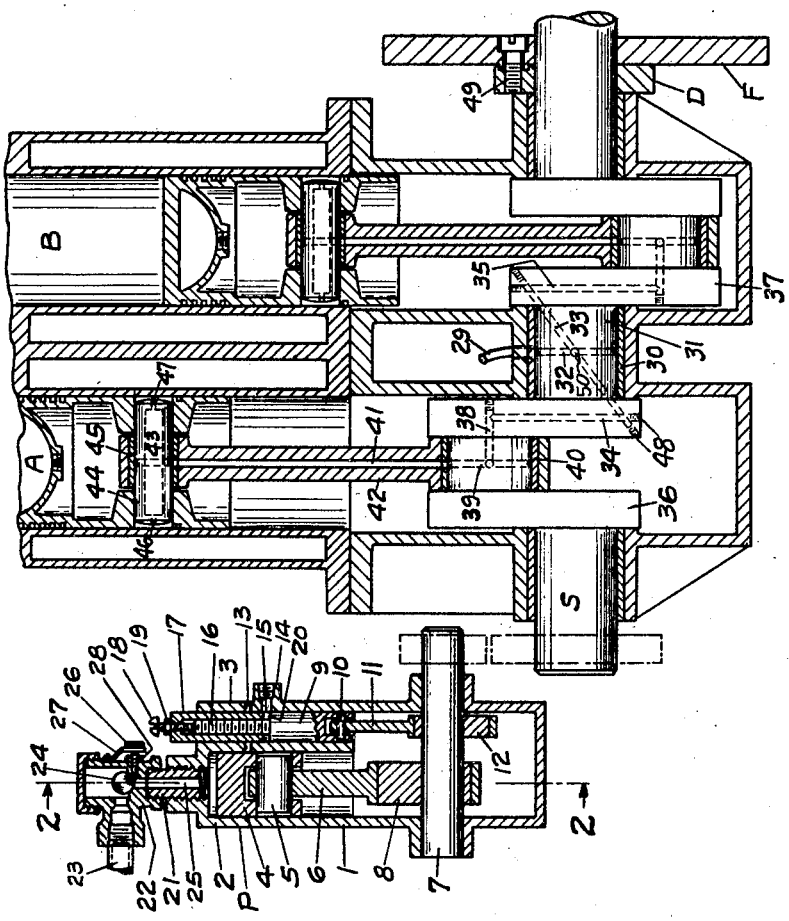
INVENTOR.
EDWARD MOORE
BY
A. D. T. Libby
Attorney Patented Mar. 30, 1948

2,438,816

UNITED STATES PATENT OFFICE 2,438,816

LUBRICATING MEANS FOR INTERNAL-COMBUSTION ENGINES

Edward Moore, Newark, N. J.

Application April 13, 1946, Serial No. 661,980

11 Claims. (Cl. 184—55)

This invention relates to a lubricating means especially adapted for lubricating internal combustion engines and more particularly those of the two-cycle solid fuel injection Diesel type of engine.

I have found from many years' experience in the Diesel engine especially of the two-cycle type that heavy oil generally referred to as "solid fuel" tends to "gum up" and seriously interfere with the lubrication of practically all the bearings of such an engine. After a long study and many experiments I have discovered a new and improved means for lubricating such an engine and while I have shown and described its application to such an engine the lubricating means may be used with other engines or with other types of engines. My improved lubricating means will be readily understood by reference to the annexed drawing wherein, Figure 1 is a sectional view through my new lubricating structure or pump.

Figure 2 is a part sectional view on the line 2—2 of Figure 1.

Figure 3 is a view similar to Figure 1 partly in section and partly in elevation but with the pistons moved 180°.

Figure 4 is a part sectional and elevational view of the principal parts of a two-cylinder two-cycle engine showing the means of lubricating the bearings thereof.

In the different views wherein like numbers refer to corresponding parts 1 is a frame work or casing shown as an integral unit but having two cylinders, 2 and 3 which are closely adjacent to each other, forming a pump P.

For the purpose of identification in the claims I have referred to the cylinder 2 as a power or output cylinder and its piston 4 as a power or output piston. The cylinder 3 I have referred to as a control or feed cylinder which will be obvious from the description which follows. The piston 4 is connected by a pin 5 to a piston arm 6 that is operatively connected to a drive shaft 7 through the medium of an eccentric 8.

Likewise, the feed or control piston 9 is connected by pin 10 and piston rod 11 to an eccentric 12 fastened to the drive shaft 7. The cylinder 3 has a cross hole or passageway 13 extending therethrough and into the cylinder 2. The cylinder 3 also has means 14 for attaching an oil feed line or pipe thereto. A hole 15 leads from 14 into the interior of the cylinder.

The piston 9 has an end 16 of reduced diameter and this end is threaded to receive cylindrical member 17 that is internally threaded so its position on the threaded stem 16 can be adjusted and locked in position by a set screw 18 and lock nut 19. As shown in Figure 1 the member 17 is adjusted so as to leave an annular groove or recess 20 the width of which can be varied by the adjustment of the cylindrical member 17. As shown in Figure 1 when the piston 9 is at the limit of its down stroke the recess 20 is in alignment with the hole 15 so that oil fed thereto in any satisfactory manner will enter the recess 20. It will be noted that when the piston 9 is at the limit of its down stroke the piston 4 is at the limit of its up stroke and the air passage is closed not only by the piston 4 but also by the cylindrical member 17 forming part of the piston 9.

The cylinder 2 has a fitting in the form of a nipple 21 fastened thereto and to the nipple 21 is attached a fitting 22 adapted to receive an output feed line or pipe 23. The fitting 22 also carries an oil check valve 24 that automatically closes the hole 25 through the nipple 21 when the piston 4 starts on its down stroke.

When the piston does start on its down stroke a vacuum is set up within the cylinder 2 and as the piston 4 uncovers the cross passage 13 air will rush therethrough into the cylinder 2. Substantially simultaneously with the uncovering of the passage 13 by the piston 4 the piston 9 has moved up so that the recess 20 is in alignment with the cross hole 13 so that the in-rushing air picks up the oil in the recess and makes a fine mixture of air and oil injected into the cylinder 2 ready to be discharged therefrom on the upstroke of the piston 4.

I have shown a bleeder screw 26 carried on a support arm 27 and locked in position by a lock nut 28 for adjusting if desired the vacuum which may be set up in the cylinder 2 by moving the ball 24 slightly off its normal seat to allow a small amount of air to come through the pipe 23. It will be understood from what has been said that the two pistons 4 and 9 are angularly set at 180 degrees on the drive shaft 7. It will also be noted that the cylindrical member 17 of the piston 9 extends beyond the casing 1 so that it may be readily adjusted as described to control the amount of oil that is to be mixed with the air.

As shown in Figure 4 the output line or pipe 23 is adapted to be connected to the fitting 29 located at the central bearing of the two-cylinder engine partially shown in Figure 4. The central bearing 30 has a hole therein in alignment with the oil hole in the fitting 29. The shaft 31 has a circumferential groove 32 in alignment with the said oil hole in the bearing 30. The shaft also has a diametrical cross hole 50 therethrough which is intercepted by a diagonal hole 33 so as to convey the oil and air mixture to the bearing 30 and holes 34 and 35 in the crank arms 36 and 37. A hole 38 leads from the hole 34 into a hole 39 carrying the mixture to the bearing 40 and also by way of hole 41 in the piston rod 42 to a chamber 43 of the piston pin 44 and its bearing 45. Holes 46 and 47 lead from the chamber 43 through the ends of the pin 44 to lubricate the side walls of the engine cylinder A. The parts of cylinder B are lubricated in the same manner as described with respect to cylinder A. The holes 33, 34, 35, 38, etc., are closed by plugs 48 so that the air and oil fluid mixture is forced by the lubricating pump P therethrough to the bearings.

The pump P may be driven from the engine crank shaft S by gears or a chain drive, it being understood that the shaft 7 of the pump is turned at a very much lower speed than the shaft S of the engine to which it is connected. This ratio may be of the order of ten to one or whatever is necessary to properly lubricate the bearings of the engine to which a given size of pump is connected.

In passing it may be mentioned that the engine shaft S has a disc D welded thereto to which a fly wheel F may be bolted as by studs 49 only one of which is shown. While the drawing shows my improved lubricating means somewhat diagrammatically, it will be understood that certain of the details may be varied without departing from the spirit of my invention or the scope of the appended claims. Having thus described my invention, what I claim is:

1. A lubricating structure having a pair of closely associated cylinders with pistons therein, one cylinder having a cross air passage therethrough and extending into the other cylinder which serves as an output cylinder having a feed line extending therefrom while the cylinder having the cross air passage serves as a feed or control cylinder, means for automatically closing off the feed line from the output cylinder during one stroke of its piston whereby a vacuum is set up in the cylinder until its piston uncovers said air passage, an oil line connected by a hole to the interior of the feed cylinder, the piston of which has a circular recess that is in alignment with the oil line hole in one position of the feed piston, the recess being in alignment with said air passage in another position of the feed piston and at a time when the output piston uncovers the air passage whereby the air rushing through said air passage into the vacuum set up in the output cylinder, picks up the oil in the feed piston recess and delivers a fine oil and air mixture to the output cylinder ready for discharge therefrom on the next stroke of its piston and means for operating both pistons simultaneously.

2. An engine lubricating means including, a pump having a power cylinder and piston and a control cylinder and piston, the two pistons being operatively connected to a drive shaft but angularly spaced thereon 180 degrees apart so that when the power piston is at the top of its stroke the control piston is at the bottom of its stroke, the power cylinder having means for attaching an output pipe thereto with an automatic check valve associated with said means, the control cylinder having means for connecting an oil pipe thereto and also having an oil hole leading from said means into the control cylinder while the control piston has an annular groove therein in alignment with said oil hole when the piston is at the lower part of its stroke, the control cylinder also having an air hole therethrough and into the power cylinder; the air hole being closed at least by the power piston when in its up position but open when the power piston is in its down position and the control piston is in its up position for the purpose described.

3. An engine lubricating means including a conveyor cylinder and a control cylinder having a common wall for part of their outer contour, a piston in the conveyor cylinder and a piston in the control cylinder, an air hole in the outer wall of the control cylinder and extending through the common wall into the conveyor cylinder with means for attaching an output pipe to the conveyor cylinder, said means having an automatic check valve associated therewith to close the connection between the pipe and the cylinder when the piston therein starts on its downward stroke, means for attaching an oil line to the wall of the control cylinder, this cylinder having an oil hole leading from said means to its interior while the control piston has an annular groove therein positioned in alignment with the oil hole when this piston is at the bottom of its stroke but in alignment with the air hole when the control piston is at the top of its stroke for the purpose described.

4. A lubricating means including a pump having an output cylinder and piston with means for attaching an output line to the cylinder and a valve for automatically closing off the output line from the cylinder when the piston starts on its downward stroke whereby a vacuum is set up in the output cylinder on the down stroke of its piston, the pump having a control cylinder and piston with an air passage through this cylinder into the output cylinder, the passage being intercepted by at least the output piston when the output piston is at any position except near to and at the bottom of its stroke, means for attaching an oil line to the control cylinder below the air passage with a hole leading from said attachment means to the interior of the control cylinder, the control piston having a groove therein in alignment with the oil hole when the piston is at the bottom of its stroke and also in alignment with the air passage when the piston is at the top of its stroke and means for reciprocating said pistons to cause a mixture of air and oil to be sent through the output line when the output piston moves on its up stroke substantially as described.

5. Engine lubricating means as set forth in claim 4 further characterized in that means are provided for regulating the amount of vacuum established by the output piston on its down stroke.

6. Engine lubricating means as set forth in claim 4 further characterized in that means are provided for regulating the width of the groove for receiving the oil coming from the oil hole.

7. Engine lubricating means as set forth in claim 4 further characterized in that means are provided for regulating the amount of vacuum established by the output piston on its down stroke and further characterized in that means are provided for regulating the width of the groove for receiving the oil coming from the oil hole.

8. Engine lubricating means as set forth in claim 4 further characterized in that the control piston has a threaded stem carrying an internally threaded cylinder having an outside diameter slightly less than the inside diameter of the control cylinder and being adjustable on the stem to regulate the width of the groove in the control piston.

9. A lubricating structure comprising a pair of closely coupled cylinders, one being an output or delivery cylinder while the other controls the composition of the mixture put out by the output cylinder, the cylinders having pistons set 180 degrees on a common drive shaft, means for automatically causing the piston in the output cylinder to set up a vacuum therein on its down stroke, an air passage through the walls of the control cylinder into the output cylinder and located so as to be substantially closed by at least the output piston except near to the end of its down stroke, the control piston having a groove therein with means for passing oil thereto when the control piston is at the bottom of its stroke, said groove being located in the piston so when it is at the top of its stroke the groove will be in alignment with said air passage whereby the suction set up in the output cylinder will cause a quick and fine mixture of air and oil in the output cylinder for delivery therefrom on the up stroke of the output piston.

10. A lubricating structure as set forth in claim 9 further characterized in that ready means are provided for adjusting the width of the groove in the control piston.

11. A lubricating structure as set forth in claim 9 further characterized in that the control piston extending outwardly beyond its cylinder and this extending end is adjustable for varying the width of the groove in the control piston.

EDWARD MOORE.

REFERENCES CITED

The following references are of record in the file of this patent:

UNITED STATES PATENTS

| Number | Name | Date |
|---|---|---|
| 1,303,622 | Williams | May 13, 1919 |

FOREIGN PATENTS

| Number | Country | Date |
|---|---|---|
| 287,417 | Great Britain | Mar. 22, 1928 |